UNITED STATES PATENT OFFICE.

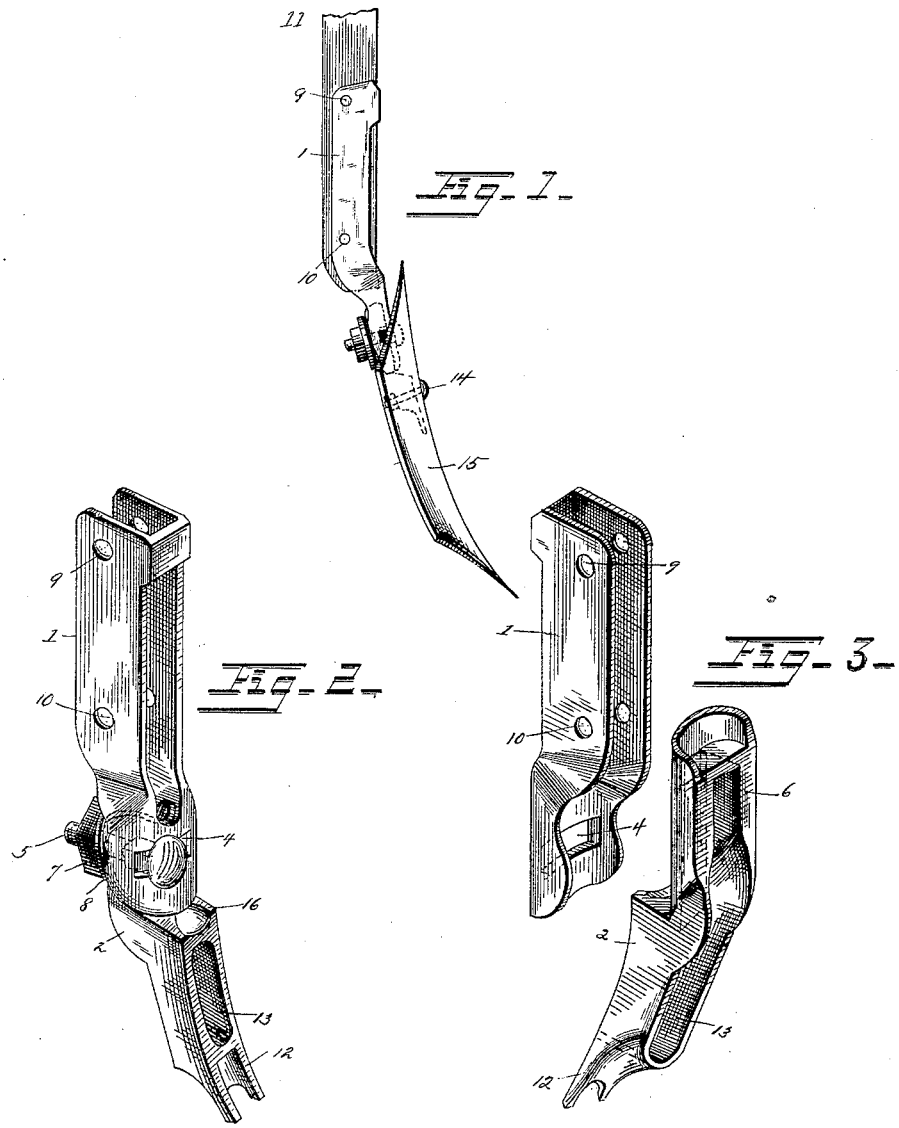

WILLIAM WARING, OF COLORA, MARYLAND.

CULTIVATOR.

SPECIFICATION forming part of Letters Patent No. 398,678, dated February 26, 1889.

Application filed November 13, 1888. Serial No. 290,665. (No model.)

*To all whom it may concern:*

Be it known that I, WILLIAM WARING, a citizen of the United States, residing at Colora, in the county of Cecil and State of Maryland, have invented certain new and useful Improvements in Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to cultivators, and more particularly to a support for the cultivator teeth or plows.

The object of the invention is to enable the tooth or plow of the cultivator to be given any desired angular adjustment, so as to vary its action on the soil.

To this end the invention embodies certain structural features which will hereinafter be fully described in the specification, and definitely indicated in the appended claims.

In the accompanying drawings, which illustrate the invention, Figure 1 is a side elevation of a plow and support constructed according to my invention, the cultivator-beam to which it is shown attached being broken away. Fig. 2 is a perspective view of the plow-support. Fig. 3 is a perspective view showing the parts of the plow-support detached.

The support consists of two parts, shown, respectively, at 1 and 2, the former of which is rigidly secured to the cultivator-beam 11 in any suitable way, as by pins, holes being provided to accommodate the pins. The parts are preferably made of malleable metal.

The part 1 consists of a skeleton-frame provided with side wings to embrace the cultivator-beam, and with its lower extremity curved and provided with a horizontal slot, 4, in the direction of curvature.

The part 2 is provided with a vertical stem, 6, having a curved face adapted to be set into and to co-operate with the inner face of the curved extension of part 1. A bolt, 5, passes through the slot 4, its head bearing against the convex side of the extension. The bolt passes through a suitable opening in the stem 6. A nut, 7, and washer 8 co-operate with the bolt to lock the two parts in any desired position.

One face of part 2 is curved, as shown at 12, to form a seat for the shovel or plow 15 of the cultivator, which is locked in place by a bolt, 14, and co-operating nut, said bolt passing through a suitable opening, 13. From this description it will be evident that the part 2 may be set in different vertical planes with reference to the part 1 by simply loosening the nut 7 and giving the part a lateral twist, the stem 6 turning smoothly in the extension of part 1, and finding a firm seat against said extension in any place of adjustment, the bolt 5 and its head being free to move in the slot 4. The lower part, 2, is provided with a shoulder, 16, against which the extension of 1 rests, and the curved seat for the shovel has its starting-point at this shoulder. This permits the upper end of the shovel when attached to clear part 1.

I am aware that it is not broadly new to render a shovel or plow of a cultivator adjustable with reference to the line of draft, and I do not lay claim thereto.

Having thus described my invention, what I claim, and desire to secure by Letters Patent, is—

1. A plow-support comprising a frame, 1, channeled to embrace a standard, said frame being provided with concave extension, and a shovel-block provided with a convex stem co-operating with the extension, the shovel-block having rotary adjustment upon the frame through a slot and bolt.

2. In a plow-support, the combination of a part, 1, adapted to be fixed to a plow-standard, a curved extension provided with a transverse slot, 4, a shovel-block provided with a stem, 6, having a curved face co-operating with the extension, and a bolt passing through the slot 4 for locking the parts together.

In testimony whereof I affix my signature in presence of two witnesses.

WILLIAM WARING.

Witnesses:
E. A. CLENDENING,
PHILIP W. BROWN.